United States Patent
Piper et al.

(10) Patent No.: US 8,166,763 B2
(45) Date of Patent: May 1, 2012

(54) GAS TURBINE FUEL INJECTOR WITH A REMOVABLE PILOT ASSEMBLY

(75) Inventors: James Scott Piper, El Cajon, CA (US); Hongyu Wang, San Diego, CA (US)

(73) Assignee: Solar Turbines Inc., San Diego, CA (US)

( * ) Notice: Subject to any disclaimer, the term of this patent is extended or adjusted under 35 U.S.C. 154(b) by 1265 days.

(21) Appl. No.: 11/898,609

(22) Filed: Sep. 13, 2007

(65) Prior Publication Data

US 2008/0066720 A1  Mar. 20, 2008

Related U.S. Application Data

(60) Provisional application No. 60/844,393, filed on Sep. 14, 2006.

(51) Int. Cl.
*F02K 1/00* (2006.01)

(52) U.S. Cl. .................. 60/737; 60/740; 60/742

(58) Field of Classification Search .............. 60/737, 60/739, 742, 740
See application file for complete search history.

(56) References Cited

U.S. PATENT DOCUMENTS

| | | |
|---|---|---|
| 1,526,923 A | 2/1925 | Meden |
| 2,425,229 A | 8/1947 | Bremser |
| 2,552,658 A | 5/1951 | Ackerman |
| 2,881,826 A | 4/1959 | Spies, Jr. |
| 2,945,629 A | 7/1960 | Chute et al. |
| 2,968,925 A | 1/1961 | Blevans et al. |
| 3,310,240 A * | 3/1967 | Grundman ............... 239/404 |
| 3,330,541 A | 7/1967 | Jackson |
| 3,398,895 A | 8/1968 | Claffey |
| 3,458,997 A | 8/1969 | Clark |

(Continued)

FOREIGN PATENT DOCUMENTS

EP  0 564 184  10/1993

(Continued)

OTHER PUBLICATIONS

Jayasuriya, Jeevan; Manrique, Arturo, Gas Turbine Combustor Lab Exercise, Royal Institute of Technology, Jan. 31, 2005, 9 pages, Stockholm.

*Primary Examiner* — William H Rodriguez
*Assistant Examiner* — Carlos A Rivera
(74) *Attorney, Agent, or Firm* — Finnegan, Henderson, Farabow, Garrett & Dunner LLP

(57) ABSTRACT

A fuel injector for a gas turbine engine is disclosed. The fuel injector includes an injector housing having a longitudinal axis. The injector housing includes one or more fuel inlets, one or more fuel galleries annularly disposed about the longitudinal axis, and an air inlet. The fuel injector also includes a premix barrel having a proximal end and a distal end circumferentially disposed about the longitudinal axis. The premix barrel is fluidly coupled to the fuel galleries and the air inlet at the proximal end, and configured to mechanically couple to a combustor of the gas turbine engine at the distal end. The fuel injector also includes a pilot assembly disposed radially inwards of the premix barrel. The pilot assembly may include a first end and a second end. The second end is removably coupled to the injector housing, and the first end is proximate the distal end of the premix barrel. The pilot assembly is fluidly coupled to the fuel galleries, the air inlet, and the combustor.

18 Claims, 11 Drawing Sheets

U.S. PATENT DOCUMENTS

| | | | |
|---|---|---|---|
| 3,684,186 A | 8/1972 | Helmrich | |
| 4,229,944 A | 10/1980 | Weiler | |
| 4,365,756 A | 12/1982 | Fisher | |
| 4,519,372 A | 5/1985 | Hoffman | |
| 5,337,961 A * | 8/1994 | Brambani et al. | 239/397.5 |
| 5,361,578 A | 11/1994 | Donlan | |
| 5,404,711 A | 4/1995 | Rajput | |
| 5,423,173 A * | 6/1995 | Lemon et al. | 60/776 |
| 5,452,574 A | 9/1995 | Cowell et al. | |
| 5,570,580 A | 11/1996 | Mains | |
| 5,598,696 A | 2/1997 | Stotts | |
| 5,706,643 A | 1/1998 | Snyder et al. | |
| 5,836,163 A * | 11/1998 | Lockyer et al. | 60/737 |
| 6,003,781 A | 12/1999 | Kwan | |
| 6,101,814 A * | 8/2000 | Hoke et al. | 60/752 |
| 6,149,075 A | 11/2000 | Moertle et al. | |
| 6,357,222 B1 | 3/2002 | Schilling et al. | |
| 6,434,945 B1 | 8/2002 | Mandai et al. | |
| 6,460,340 B1 | 10/2002 | Chauvette et al. | |
| 6,595,000 B2 | 7/2003 | Lavie et al. | |
| 6,655,145 B2 * | 12/2003 | Boardman | 60/737 |
| 6,698,207 B1 | 3/2004 | Wiebe et al. | |
| 6,755,024 B1 * | 6/2004 | Mao et al. | 60/776 |
| 6,761,035 B1 | 7/2004 | Mueller | |
| 6,857,271 B2 | 2/2005 | Kraft et al. | |
| 6,862,888 B2 | 3/2005 | Akagi et al. | |
| 6,898,926 B2 | 5/2005 | Mancini | |
| 6,915,638 B2 | 7/2005 | Runkle et al. | |
| 7,024,861 B2 | 4/2006 | Martling | |
| 7,117,675 B2 | 10/2006 | Kaplan et al. | |
| 7,690,203 B2 | 4/2010 | Bland | |
| 2002/0073708 A1 | 6/2002 | Lavie et al. | |
| 2002/0138969 A1 | 10/2002 | Dallmeyer et al. | |
| 2002/0148230 A1 | 10/2002 | Halila et al. | |
| 2004/0055306 A1 | 3/2004 | North et al. | |
| 2004/0177615 A1 | 9/2004 | Martling | |
| 2004/0195389 A1 | 10/2004 | Neumaier et al. | |
| 2005/0039460 A1 | 2/2005 | Sobieski et al. | |
| 2007/0039329 A1 | 2/2007 | Abreu et al. | |
| 2007/0130955 A1 | 6/2007 | Vandale et al. | |
| 2008/0066720 A1 | 3/2008 | Piper et al. | |
| 2008/0083229 A1 | 4/2008 | Haynes et al. | |
| 2009/0107147 A1 * | 4/2009 | Piper et al. | 60/738 |
| 2009/0133402 A1 * | 5/2009 | Piper et al. | 60/740 |

FOREIGN PATENT DOCUMENTS

| | | |
|---|---|---|
| EP | 1 323 982 | 7/2003 |
| EP | 1 493 970 | 1/2005 |
| EP | 1 672 282 | 6/2006 |
| WO | WO 01/55646 | 8/2001 |

* cited by examiner

GAS TURBINE FUEL INJECTOR WITH A REMOVABLE PILOT ASSEMBLY

CROSS REFERENCE TO RELATED APPLICATIONS

This application is based upon and claims the benefit of priority from U.S. Provisional Application No. 60/844,393 to Piper et al. filed on Sep. 14, 2006, the entire contents of which are incorporated herein by reference.

TECHNICAL FIELD

The present disclosure relates generally to a fuel injector for a gas turbine engine, and more particularly, to a gas turbine fuel injector with a removable pilot assembly.

BACKGROUND

Gas turbine engines ("GTE's") produce power by extracting energy from a flow of hot gas produced by combustion of fuel in a stream of compressed air. In general, GTE's have an upstream air compressor coupled to a downstream turbine with a combustion chamber ("combustor") in between. Energy is released when a mixture of compressed air and fuel is ignited in the combustor. The resulting hot gases are directed over the turbine's blades, spinning the turbine, thereby, producing mechanical power. In typical GTE's, one or more fuel injectors direct some type of fossil fuel into the combustor for combustion. Combustion of fossil fuel results in the production of some undesirable constituents in GTE exhaust emissions. These undesirable constituents include nitrogen oxide (NO) and nitrogen dioxide ($NO_2$), which are collectively referred to as $NO_x$. In some countries, government regulations restrict the allowable level of $NO_x$ that may emitted by GTE's.

The amount of $NO_x$ emissions from a GTE increases with the flame temperature in the combustor. Therefore, one technique used by GTE manufacturers to meet $NO_x$ regulations is to reduce the flame temperature in the combustor of the GTE. Low flame temperature in the combustor may be achieved by reducing the fuel content in the fuel-air mixture fed into the combustor and by thoroughly mixing the fuel in the air before the fuel-air mixture is directed into the combustion chamber. Such a well mixed fuel-air mixture with a lower fuel content is referred to as a lean premixed mixture. While this lean premixed mixture reduces $NO_x$ emissions, reducing the fuel content in the mixture below a threshold value may cause the resulting flame to be unstable. The unstable flame may cause undesirable pressure oscillations within the combustor, eventually leading to smothering of the flame (called "lean blow-out").

To provide a stable flame while meeting $NO_x$ emission regulations, some GTE fuel injectors provide for multiple fuel paths or streams, such as a main fuel stream and a pilot fuel stream. In such a system, the main fuel stream provides lean premixed fuel to the combustor for low $NO_x$ operation, while the pilot fuel stream provides a source of rich fuel to the combustor for flame stabilization and startup. U.S. Pat. No. 5,404,711 ('711 patent), a patent issued to the assignee of the current disclosure, on Apr. 11, 1995, describes a GTE fuel injector with main and pilot fuel streams. While the injector of the '711 patent has proven to be reliable and robust, and has achieved wide commercial success, the assembly providing the pilot fuel stream of the '711 patent are permanently attached to the rest of the injector structure to provide a good seal against fuel and air leakage. Since GTE fuel injectors are positioned close to the combustion flame, the components of the injector may be subject to high temperature damage mechanisms. While the permanent attachment of the pilot assembly of the '711 patent prevents fuel and air leakage, replacement of a damaged pilot component in a field environment becomes difficult. The present disclosure is directed to solving one or more of the problems set forth above.

SUMMARY OF THE INVENTION

In one aspect, a fuel injector for a gas turbine engine is disclosed. The fuel injector includes an injector housing having a longitudinal axis. The injector housing includes one or more fuel inlets, one or more fuel galleries annularly disposed about the longitudinal axis, and an air inlet. The fuel injector also includes a premix barrel having a proximal end and a distal end circumferentially disposed about the longitudinal axis. The premix barrel is fluidly coupled to the fuel galleries and the air inlet at the proximal end, and configured to mechanically couple to a combustor of the gas turbine engine at the distal end. The fuel injector also includes a pilot assembly disposed radially inwards of the premix barrel. The pilot assembly may include a first end and a second end. The second end is removably coupled to the injector housing, and the first end is proximate the distal end of the premix barrel. The pilot assembly is fluidly coupled to the fuel galleries, the air inlet, and the combustor.

In another aspect, a method of assembling a fuel injector of a gas turbine engine is disclosed. The method includes inserting a tubular inner component within a tubular middle component and inserting the middle component within a tubular outer component. The method also includes sliding the inner component over a tubular central component of the fuel injector, and rotating the outer component about a longitudinal axis of the fuel injector to removably couple the outer component to the fuel injector.

In yet another aspect, a gas turbine engine is disclosed. The gas turbine includes a central shaft having a first longitudinal axis, a compressor coupled to the central shaft, and a combustor fluidly coupled to the compressor and annularly disposed around the first longitudinal axis. The gas turbine also includes a plurality of fuel injectors each having a second longitudinal axis coupled to the combustor. Each fuel injector of the plurality is annularly arranged about the first longitudinal axis and includes a housing that includes one or more fuel conduits and an air inlet. The fuel injector also includes a substantially cylindrical premix barrel disposed circumferentially around the second longitudinal axis. The premix barrel is coupled to the housing at one end and the combustor at an opposite end. The fuel injector also includes a pilot assembly disposed radially inwards of the premix barrel. The pilot assembly is concentrically aligned with the second longitudinal axis, and removably coupled to the housing. The pilot assembly includes two or more concentric tubular components disposed about the second longitudinal axis, a fuel duct, and an air duct. The fuel duct and the air duct are each formed in an annular space between the two or more tubular components. The fuel duct fluidly communicates the fuel conduits to the combustor and the air duct fluidly communicates the air inlet to the combustor.

In yet another aspect, a pilot assembly for a gas turbine fuel injector is disclosed. The pilot assembly includes an outer tube having a first end and a second end disposed about a longitudinal axis. The outer tube includes screw threads at an external surface proximate the second end. The screw threads are configured to removably couple with the fuel injector. The outer tube also includes an end surface extending radially inwards from the first end, and an annular first step extending radially inwards from a location proximate the first end. The first step includes a plurality of cooling passages annularly arranged about the longitudinal axis. The pilot assembly also includes a middle tube having a third end and a fourth end. The middle tube is disposed about the longitudinal axis and is located radially inwards of the outer tube. The middle tube includes a plurality of holes extending from an external surface to an internal surface of the middle tube. The plurality of holes are located proximate the third end and are annularly arranged about the longitudinal axis. The middle tube also includes an annular second step extending radially outwards from the external surface proximate the third end, the second step abutting the first step of the outer tube. The middle tube further includes an annular third step extending radially inwards. The pilot assembly further includes an inner tube having a fifth end and a sixth end disposed about the longitudinal axis and located radially inwards of the middle tube. The fifth end abuts the third step of the middle tube.

In yet another aspect, a component for a fuel injector is disclosed. The component includes a first tube annularly disposed about a longitudinal axis and extending from a first end to a second end. The first tube includes a first surface proximate the first end. The shape of the first surface substantially resembles a truncated cone. The first tube also includes a substantially cylindrical second surface proximate the second end. The second surface is substantially contiguous with the first surface and disposed radially inwards of the first surface. The first tube also includes an annular end surface substantially contiguous with the first surface extending radially inwards from the first end. The end surface including a substantially circular opening, the opening being centrally positioned on the longitudinal axis. The first tube also includes an annular flange extending radially inwards from a location proximate the first end. The flange being substantially parallel to the end surface and including a plurality of passages annularly arranged about the longitudinal axis. The component also includes a second tube annularly disposed about the longitudinal axis and extending from a third end to a fourth end. The second tube includes a substantially cylindrical external surface extending from the third end to the fourth end, wherein a region of the external surface proximate the fourth end includes screw threads. The second tube also includes a substantially cylindrical internal surface extending from the third end to the fourth end. A region of the internal surface proximate the third end is attached to the second surface of the first tube.

In yet another aspect, a component for a fuel injector is disclosed. The component includes an annular first part disposed about a longitudinal axis and having a first end and a second end. The first part includes a substantially cylindrical outer surface extending from the first end to the second end, and an inner surface extending from the first end to the second end. The inner surface having a shape resembling a truncated cone with a smaller diameter proximate the first end and a larger diameter proximate the second end. The first part also includes an annular protrusion on the outer surface. The annular protrusion is located proximate the first end and extends substantially perpendicular to the longitudinal axis. The first part also includes a plurality of holes extending radially inwards from the outer surface to the inner surface, and annularly arranged about the longitudinal axis. The component also includes an annular second part extending from a third end to a fourth end. The second part includes a stepped external surface and a substantially cylindrical internal surface both extending from the third end to the fourth end and disposed annularly about the longitudinal axis. The external surface proximate the third end is attached to the second end of the first part. The second part also includes a plurality of cavities extending inwards from the fourth end to the third end. The cavities are arranged annularly about the longitudinal axis. The component also includes a substantially cylindrical third part annularly disposed about the longitudinal axis and extending from a fifth end to a sixth end. The fifth end is attached to the external surface of the second part proximate the fourth end.

DETAILED DESCRIPTION

Figure 1:
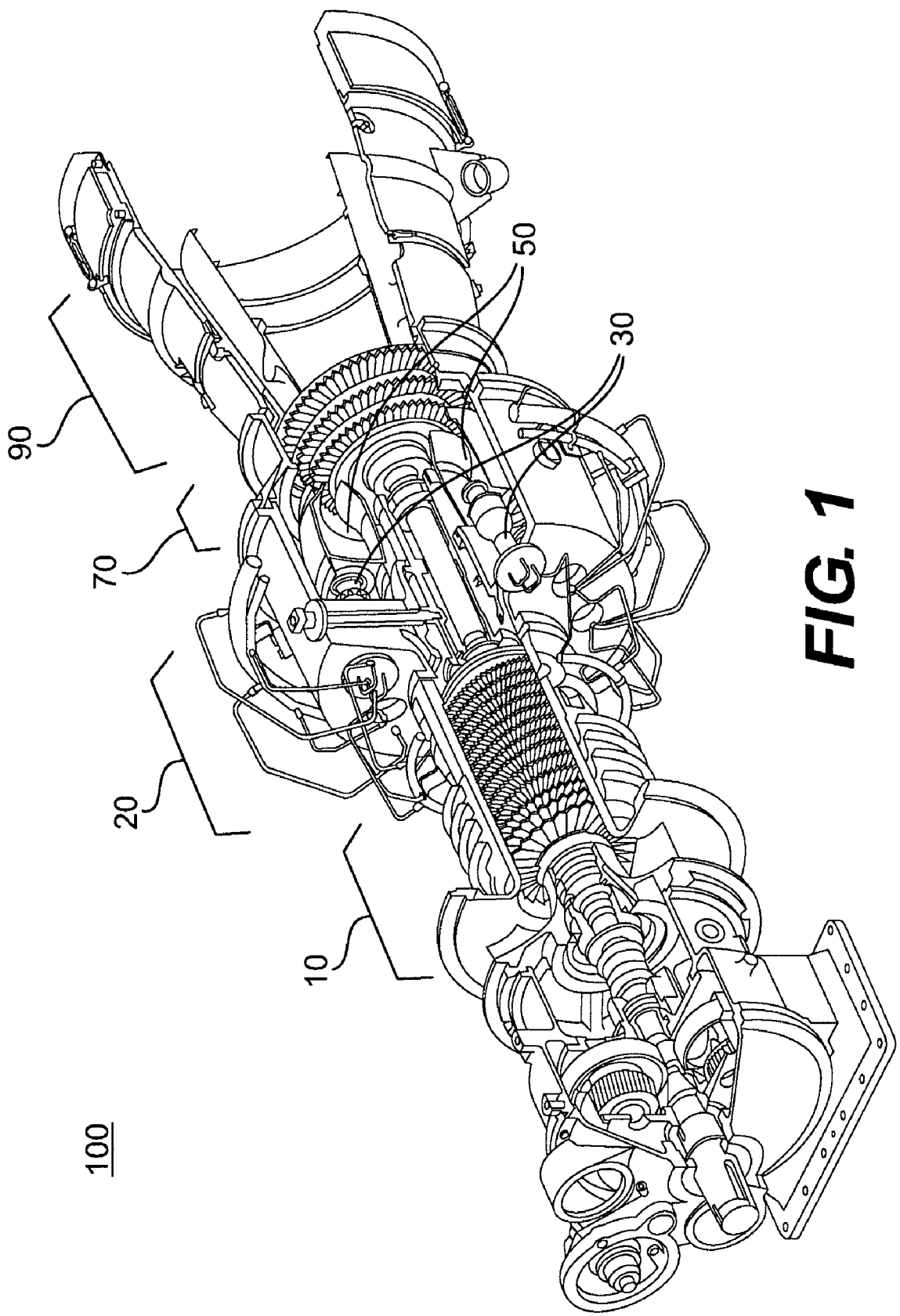
FIG. 1 is an illustration of an exemplary disclosed engine system.

FIG. 1 illustrates an exemplary gas turbine engine (GTE) 100. GTE 100 may have, among other systems, a compressor system 10, a combustor system 20, a turbine system 70, and an exhaust system 90. In general, compressor system 10 compresses incoming air to a high pressure, combustor system 20 mixes the compressed air with a fuel and burns the mixture to produces high-pressure, high-velocity gas, and turbine system 70 extracts energy from the high-pressure, high-velocity gas flowing from the combustor system 20. It should be emphasized that, in this discussion, only those aspects of GTE 100 useful to illustrate the disclosed fuel injector with a removable pilot assembly will be discussed.

Compressor system 10 may include any device capable of compressing air. In some embodiments this may include an axial flow compressor that produces a continuous flow of compressed air. This compressed air may be directed to an inlet port of combustor system 20. Combustor system 20 may include a plurality of fuel injectors 30 configured to mix a fuel with the compressed air. The fuel-air mixture may be then directed to one or more combustors 50 of combustor system 20. In some embodiments, the fuel injectors 30 may include multiple flow paths to deliver fuel to combustor 50. One of these multiple flow paths may deliver fuel premixed with compressed air to combustor 50, while another flow path may inject a fine spray of fuel and compressed air into combustor 50.

The fuel delivered to combustor 50 may include any known hydrocarbon based liquid or gaseous fuel. Liquid fuels may include diesel, heizol EL (extra light), gas oil, jet propellant, or kerosene. In some embodiments, liquid fuels may also include natural gas liquids (such as, for example, ethane, propane, butane, etc.), paraffin oil based fuels (such as, JET-A), and gasoline. Gaseous fuels may include natural gas. In some embodiments, the gaseous fuel may also include alternate gaseous fuels such as, for example, liquefied petroleum gas (LPG), ethylene, landfill gas, sewage gas, ammonia, biomass gas, coal gas, refinery waste gas, etc. This listing of liquid and gaseous fuels are not intended to be an exhaustive list but merely exemplary. In general, any liquid or gaseous fuel known in the art may be delivered to combustor 50 through fuel injector 30.

The fuel delivered to combustor 50 may undergo combustion in combustor 50 to form a high pressure mixture of combustion byproducts. The high temperature and high pressure mixture from combustor 50 may be directed to turbine system 70. Energy may be extracted from these hot pressurized gases in turbine system 70. For instance, the hot combustion gases may rotate blades connected to a shaft of a generator, and thereby produce power. The combustion gases may then be discharged to the atmosphere through exhaust system 90.

Combustion of the hydrocarbon based fuel in combustor 50 may produce byproducts such as $NO_x$, carbon monoxide (CO), carbon dioxide ($CO_2$), and un-burnt hydrocarbons. Government regulations may limit the amount of $NO_x$ that may be discharged through exhaust system 90. Formation of $NO_x$ in combustor 50 may result from a reaction between fuel and air at high temperatures. $NO_x$ formation may be reduced by reducing flame temperature during combustion. It may be desirable to maintain the flame temperature at a value high enough to ensure a stable combustion process and prevent the flame from being extinguished (that is, prevent "lean blow-out"). Multiple flow paths of fuel injector 30 may help control flame temperature in combustor 50 to be within a range low enough to reduce $NO_x$ emissions while being high enough to prevent lean blowout.

Figure 2:
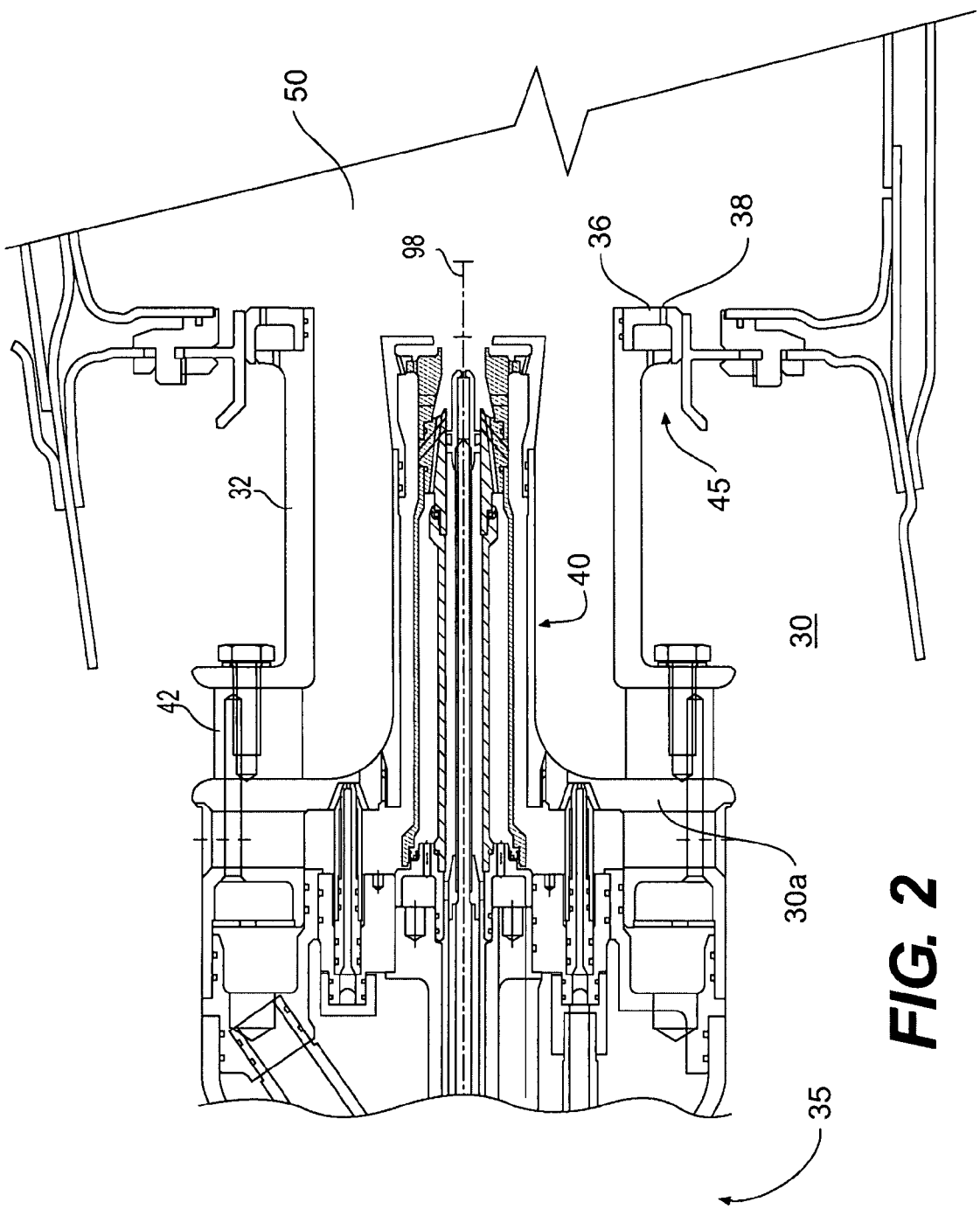
FIG. 2 is an illustration of an exemplary fuel injector attached to a combustor of the engine system of FIG. 1.

FIG. 2 is an illustration of a downstream portion of a fuel injector attached to combustor 50. Fuel injector 30 may include a first end 45 coupled to combustor 50 and a second end 35 opposite first end 45. Fuel injector 30 may include components that cooperate to deliver gaseous or liquid fuel to combustor 50. Some embodiments of fuel injector 30 may include components that are configured to deliver both liquid and gaseous fuel to combustor 50. In these embodiments, the fuel supply may be switched between gaseous and liquid fuels to suit operating conditions of GTE 100. For instance, at an operating site with an abundant supply of natural gas, fuel injector 30 may deliver liquid fuel to combustor 50 during start up and later switch to gaseous fuel to utilize the locally available fuel supply. Fuel injectors capable of delivering both liquid and gaseous fuels to combustor 50 are sometimes referred to as dual fuel injectors. In this disclosure, the term fuel injector is used to refer to all types of fuel injectors that may be used in GTE's. Fuel injector 30 may deliver multiple streams of fuel to combustor 50. In some embodiments, these multiple flow paths may include a main fuel flow path and a pilot fuel flow path. The concentration (of fuel in air) and amount of fuel delivered to combustor 50 through the main fuel flow and the pilot fuel flow paths may be varied by a control system of GTE 100.

In the embodiment illustrated in FIG. 2, fuel injector 30 may have a generally cylindrical structure with a substantially tubular premix barrel 32 circumferentially disposed around a pilot assembly 40. Both premix barrel 32 and pilot assembly 40 may be centered about longitudinal axis 98. Premix barrel 32 may deliver a premixed fuel-air mixture to combustor 50 while pilot assembly 40 may deliver a spray of fuel and air to combustor 50. The premixed fuel-air mixture delivered through premix barrel 32 may comprise the main fuel flow, and the spray of fuel and air delivered through pilot assembly may comprise the pilot fuel flow.

Compressed air from compressor system 10 may be directed to fuel injector 30 through an air swirler 42. Air swirler 42 may include a plurality of straight or curved blades attached to fuel injector 30 to swirl the incoming compressed air. The number of curved blades in an air swirler of a fuel injector may depend upon the specific characteristics of GTE 100, some embodiments of fuel injectors may have twelve curved blades while others may have a different number of blades. Although air swirler 42 in FIG. 2 is illustrated as a radial swirler, air swirler 42 in general, may include a radial or an axial swirler. A radial swirler is an air swirler in which compressed air from compressor system 10 may be directed to the curved blades radially, while an axial swirler is an air swirler in which the compressed air may be directed to the curved blades axially.

Liquid and or gaseous fuel may be injected into the swirled air stream through nozzles to mix with the compressed air. Swirling the compressed air may help mix the fuel thoroughly with the compressed air. The premixed air-fuel mixture may be directed to combustor 50 through premix barrel 32. The premixed air-fuel mixture may create premixed flames within combustor 50. Premixed flames are flames that are created when fuel and air are first mixed in fuel injector 30 and then burned in combustor 50. As discussed earlier, in embodiments where low $NO_x$ emission is desired, the flame temperature of these premixed flames may be reduced by delivering a lean premixed air-fuel mixture through premix barrel 32.

Premix barrel 32 may include an elongate tubular section with two opposing end sections. One of the end sections may include an end face with an end cap 36 coupled thereto. The end face may be coupled to combustor 50 such that a central opening fluidly communicates premix barrel 32 with combustor 50. The end cap 36, along with an array of holes located therein, may function as an array of helmholtz resonators configured to attenuate acoustic vibrations arising in combustor 50 as a result of instabilities in the combustion process. An end section opposite to end face may be coupled to a housing 30a of fuel injector 30. In some embodiments, premix barrel 32 may be removably coupled to housing 30a using fasteners.

Pilot assembly 40 may also be removably coupled to housing 30a of fuel injector 30. Pilot assembly 40 may be disposed radially inwards of premix barrel 32. Pilot assembly 40 may include components configured to inject a stream of pressurized fuel and a stream of compressed air into combustor 50. The fuel delivered to combustor 50 through pilot assembly 40 may include liquid and/or gaseous fuel. In dual fuel injectors, pilot assembly 40 may be configured to deliver both liquid and gaseous fuel to combustor 50. Pilot assembly 40 may also include swirl features (not shown) to swirl the compressed air delivered to combustor 50 through pilot assembly 40. The pressurized stream of fuel and air delivered through pilot assembly 40 may comprise the pilot fuel flow. This pressurized stream of fuel and air may create a diffusion flame in combustor 50. Diffusion flames are flames that are created when fuel and air mix and burn at the same time. Diffusion flames may have a higher flame temperature than premixed flames, and may serve as a localized hot flame to stabilize the combustion process and prevent lean blowout.

Figure 3A:
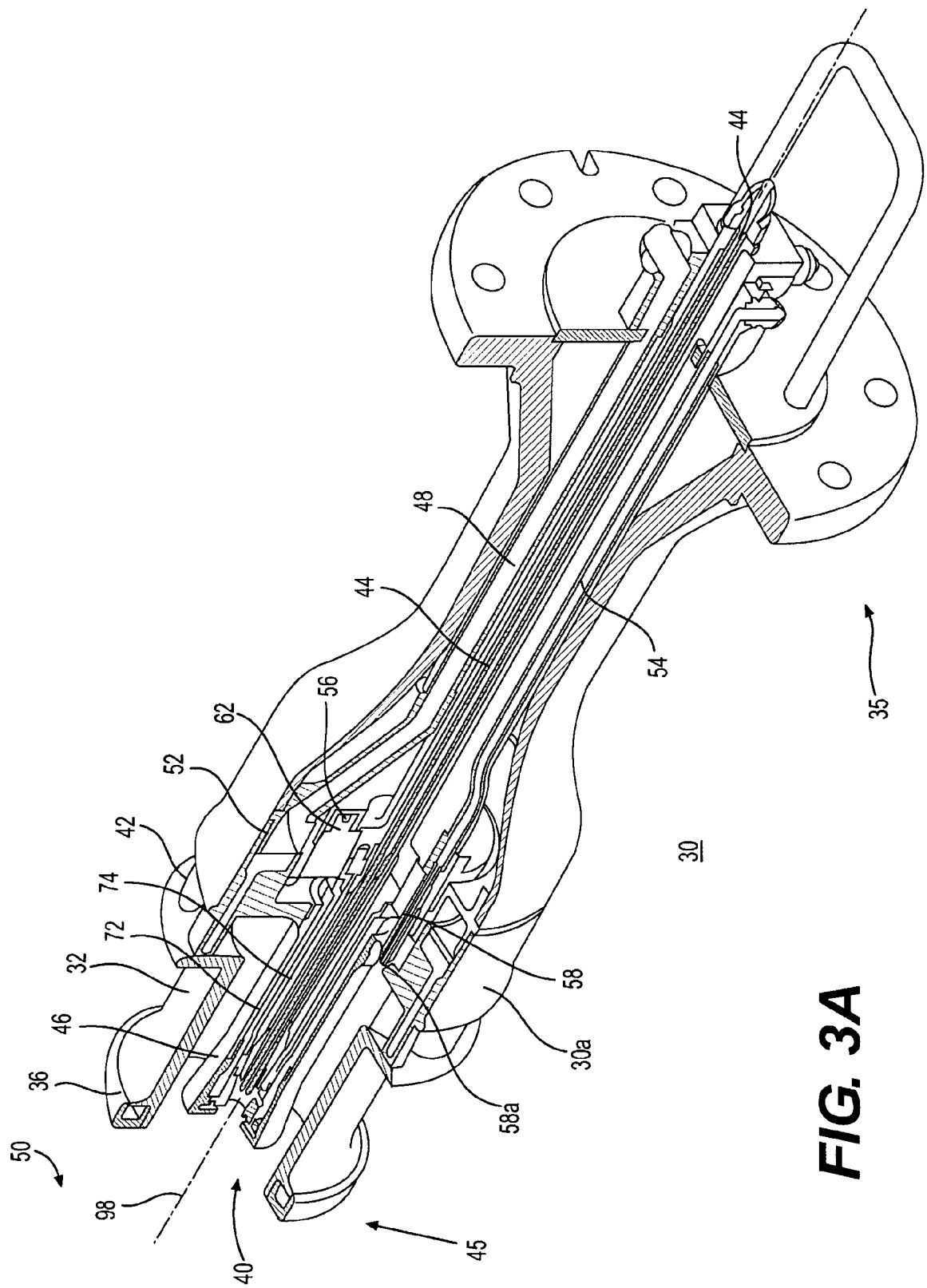
FIGS. 3A-3C are cutaway illustrations of the fuel injector of FIG. 2.
Figure 3B:
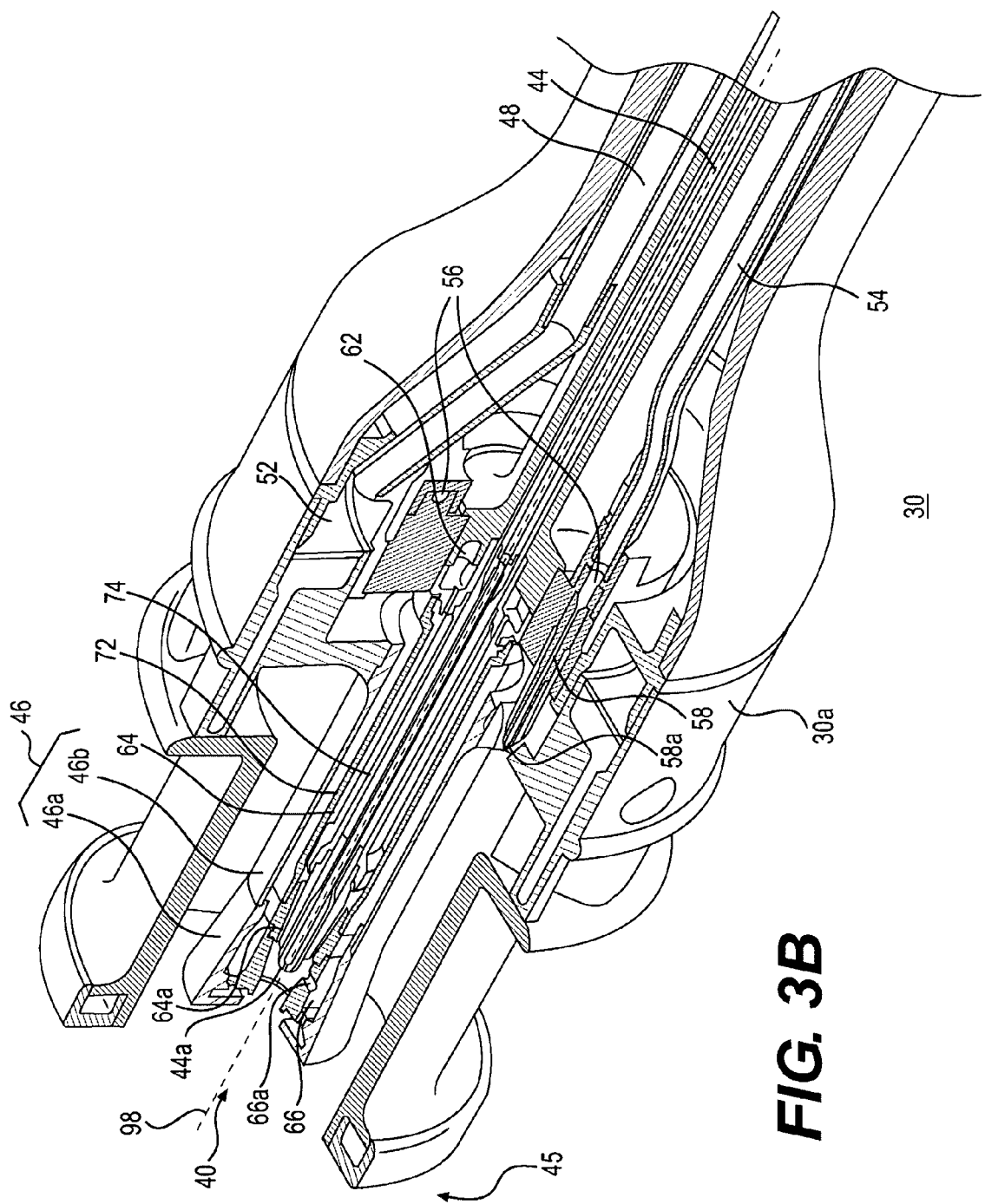
Figure 3C:
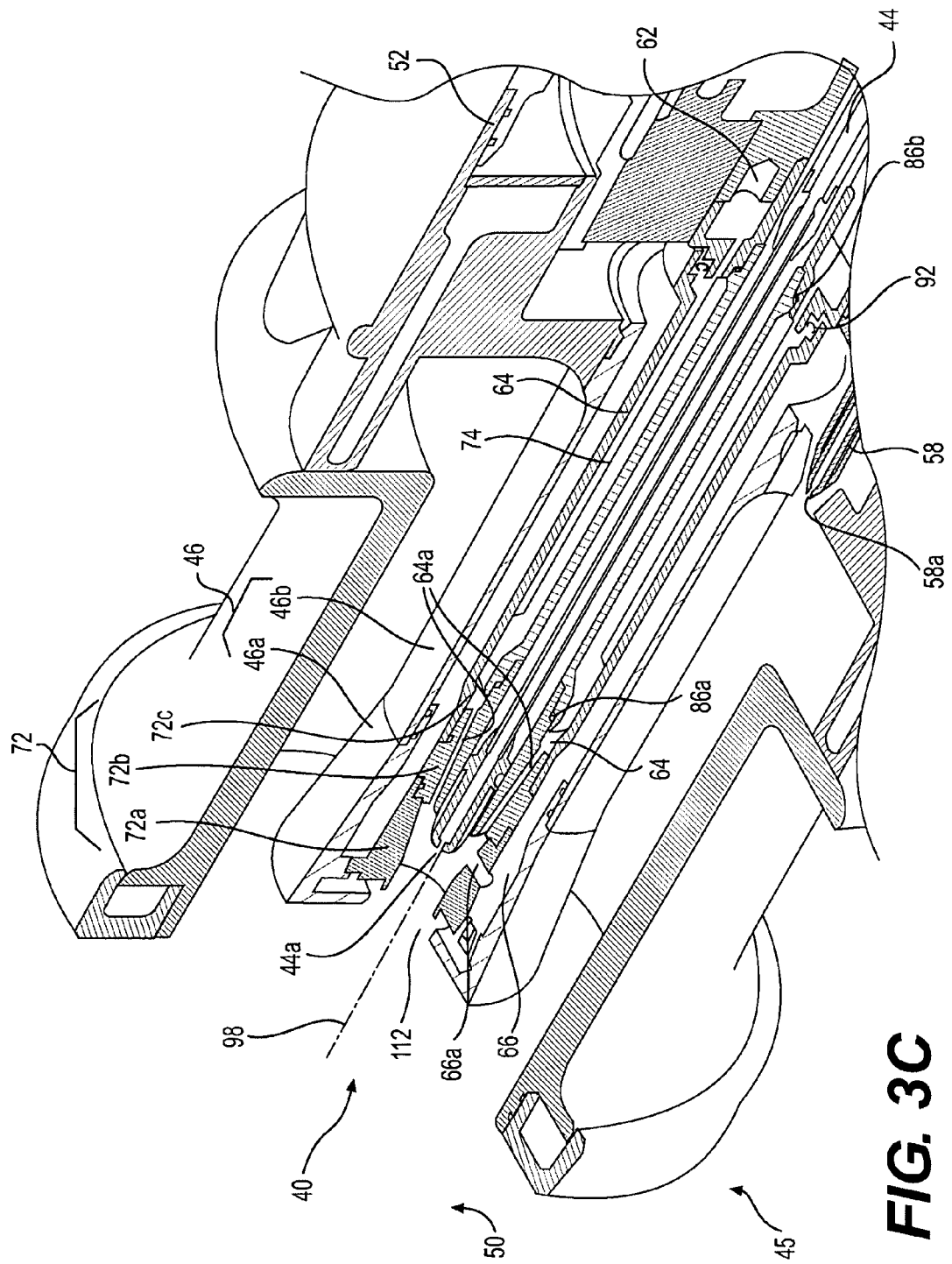

FIGS. 3A-3C depict cutaway views of an exemplary fuel injector 30 illustrating the various components therein. FIG. 3A depicts the entire fuel injector while FIGS. 3B and 3C depict first end 45 of fuel injector 30 at different levels of magnification. In the discussion that follows, reference will be made to FIGS. 3A-3C. Fuel injector 30 may have a generally tubular configuration with an inner and an outer tube arranged concentrically about longitudinal axis 98. The outer tube of fuel injector 30 may comprise premix barrel 32 and the inner tube may comprise pilot assembly 40. As described earlier, premix barrel 32 may direct the main fuel flow (premixed air-fuel mixture) to combustor 50 while pilot assembly 40 may deliver the pilot fuel stream (pressurized fuel along with compressed air) to combustor 50.

A main gas tube 48 may supply fuel gas from a gas manifold (not shown) to a main gas gallery 52 of fuel injector 30. Main gas gallery 52, annularly positioned around longitudinal axis 98, may feed the gaseous fuel to gas ports that may be located proximate air swirler 42. Gas ports may be small holes located on the blades of air swirler 42 ("154a" in FIGS. 6B and 6D), upstream of air swirler 42, or downstream of air swirler 42. Compressed air from compressor system 10 may be directed into fuel injector 30 through air swirler 42. The gas ports may deliver gaseous fuel to fuel injector 30. The gaseous fuel may be mixed with swirled compressed air, and delivered to combustor 50 through premix barrel 32

Liquid tube 54 may supply liquid fuel from a liquid fuel supply (not shown) to a main liquid gallery 56 of fuel injector 30. As best shown in FIG. 3B, main liquid gallery 56 may include an annular channel around longitudinal axis 98 fluidly coupled to one or more liquid fuel nozzles annularly arranged, at substantially constant spacing, around longitudinal axis 98. FIGS. 3A-3C illustrate one liquid fuel nozzle 58 of the one or more liquid fuel nozzles that may be fluidly coupled to main liquid gallery 56. A nozzle tip 58a of liquid fuel nozzle 58 may be configured to spray the liquid fuel into the swirled compressed proximate air swirler 42. In some embodiments, the number of liquid fuel nozzles 58 may be half the number of blades on air swirler 42, and may be positioned proximate every alternate blade of air swirler 42.

Pilot assembly 40 may also include gaseous and liquid fuel lines to provide fuel for the pilot flow path. Main gas gallery 52 may supply gaseous fuel to pilot gas gallery 62. Pilot gas gallery 62 may also be annularly located around longitudinal axis 98. Pilot gas gallery 62 may direct gaseous fuel to pilot gas duct 64. Pilot gas duct 64 may be an annular duct around longitudinal axis 98 and may include one or more pilot gas nozzles 64a. Pilot gas nozzles 64a may include openings arranged annularly around longitudinal axis 98 that may direct gaseous fuel from pilot gas duct 64 to combustor 50. A pilot air duct 66 may also direct compressed air into pilot assembly 40 through pilot air nozzle 66a. Pilot air duct 66 may be an annular duct arranged about longitudinal axis 98 with a plurality of pilot air nozzles 66a fluidly coupled thereto. Each pilot air nozzle 66a may be positioned proximate a pilot gas nozzle 64a. The proximate positioning of pilot gas nozzle 64a and pilot air nozzle 66a may assist in mixing the pilot gas stream with compressed air before being directed to combustor 50.

Pilot liquid tube 44 may direct liquid fuel from outside fuel injector 30 to pilot assembly 40. Pilot liquid tube 44 may extend from second end 35 of fuel injector 30 and terminate at a pilot liquid nozzle 44a centrally located within pilot assembly 40. Pilot liquid tube 44 may include a single tube or may include multiple tubes coupled together. Liquid fuel from pilot liquid tube 44 may be sprayed into the air stream from pilot air nozzle 66a using pilot liquid nozzle 44a. The pressurized liquid fuel from pilot liquid nozzle 44a along with compressed air may comprise the pilot fuel flow. This pilot fuel flow may be delivered to combustor 50 through a central opening 112 (FIG. 3C) of pilot assembly 40. This pressurized fuel and air may burn at the end of pilot assembly 40 that abuts combustor 50, to form a diffusion flame. As mentioned earlier, this diffusion flame may burn hotter than the premixed flame and may serve to stabilize the combustion process in combustor 50.

Figure 4:
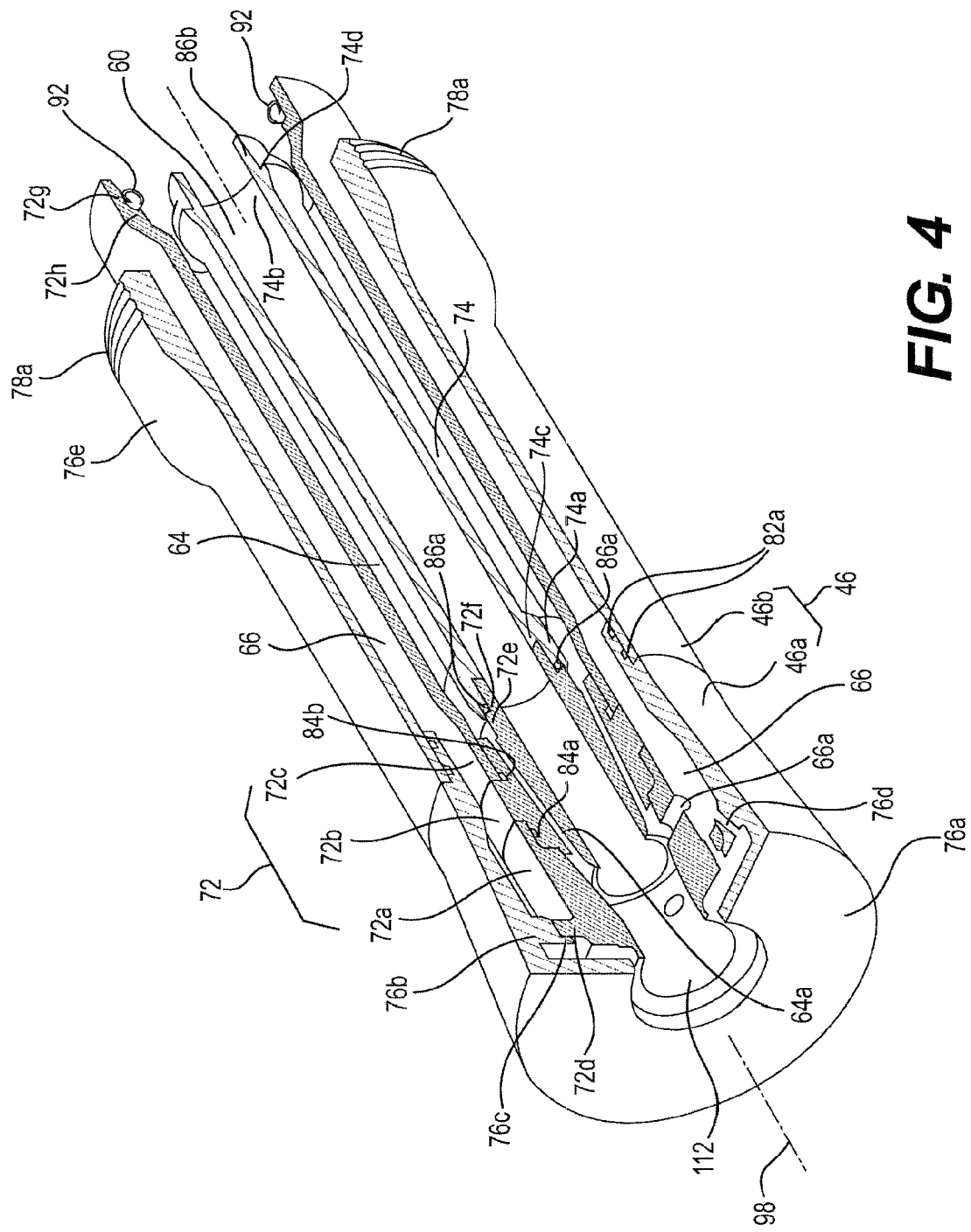
FIG. 4 is an illustration of a cutaway view of an exemplary pilot assembly of the fuel injector of FIG. 2.

FIG. 4 shows a cutaway view of pilot assembly 40 illustrating the components therein. In the description that follows reference will be made to both FIG. 4 and FIG. 3C. Pilot assembly 40 may generally have a tubular configuration with an outer tube, a middle tube and an inner tube arranged concentrically about longitudinal axis 98. The outer tube of pilot assembly 40 may include a premix tube 46 disposed radially outwards of a gas pilot shroud 72, which comprises the middle tube. The inner tube may include an air assist shroud 74 disposed radially inwards of gas pilot shroud 72. Premix tube 46, gas pilot shroud 72 and air assist shroud 74 may enclose the fuel and compressed air conduits (pilot liquid tube 44, pilot gas duct 64, and pilot air duct 66) of pilot assembly 40.

Premix tube 46 may include pilot cap 46a and pilot tube 46b brazed together at braze joint 82a. Pilot cap 46a and pilot tube 46b may be formed from any material that possess good high temperature strength properties. In some embodiments, pilot cap 46a and pilot tube 46b may be made of Alloy-188. Braze joint 82a may be formed by one or more annular rings of braze material disposed at an interface between pilot cap 46a and pilot tube 46b. Any braze material known in the art (such as, AMS 4775, AMS 4776, AMS 4777, AMS 4778, AMS 4779, AMS 4782, etc.) may be used to braze pilot cap 46a to pilot tube 46b.

Pilot cap 46a may have a shape resembling a truncated cone and may include an end face 76a at the end of pilot assembly 40 that abuts combustor 50. End face 76a may include an annular section, extending substantially perpendicularly from pilot cap 46a, that frames central opening 112 of pilot assembly 40. The diffusion flame formed by pilot fuel flow emanating from central opening 112 may abut and heat end face 76a. Pilot end cap 46a may also include a first flange 76b that projects inwardly towards longitudinal axis 98. First flange 76b may be an annular projection formed on pilot cap 46a and may include features, for example, a first step feature 76c, that is configured to mate with a corresponding feature on gas pilot shroud 72. First flange 76b may also include one or more cooling passages 76d that may direct compressed air from pilot air duct 66 to a rear side of end face 76a. Compressed air impinging on the rear side of end face 76a may help cool end face 76a. External screw threads 78a may be formed on pilot tube 46b at a third end 76e opposite pilot cap 46a. These external screw threads 78a may removably attach pilot assembly 40 to housing 30a of fuel injector 30.

Gas pilot shroud 72 may include a tubular structure positioned inwards of premix tube 46. Pilot air duct 66, which delivers compressed air to pilot assembly, may be formed in an annular space between premix tube 46 and gas pilot shroud 72. Gas pilot shroud 72 may include multiple components. In the embodiment illustrated in FIG. 4, a first component 72a, a second component 72b, and a third component 72c are coupled together end-to-end to create the tubular structure of gas pilot shroud 72. First component 72a, second component 72b, and third component 72c may be made of any material that may withstand the temperatures experienced by these components. Non-limiting examples of materials that may be used for the components of gas pilot shroud 72 may include, for example, various grades of stainless steel (such as, for example grade 316, 316L (low carbon), etc.), hastealloy, etc. In some embodiments, these components may be made of the same material while in others some components may be made of different materials.

First component 72a may include a second flange 72d, at a location proximate end face 76a, that may mate with first step feature 76c of pilot cap 46a. First component 72a may extend from second flange 72d towards second end 35 of fuel injector 30, and may be brazed to second component 72b at brazed joint 84a. Second component 72b may include an annular region that projects towards longitudinal axis 98. This annular projecting region of second component 72b may include the one or more pilot gas nozzles 64a passing there-through. The annular projecting region of second component 72b may also include a fourth end 72f opposite second flange 72d. Fourth end 72f may include features, for example, second step feature 72e, that may be configured to mate with a corresponding feature on air assist shroud 74. Second component 72b may be brazed to third component 72c at brazed joint 84b. Braze joints 84a and 84b may be formed of the same material as braze joint 82a, or may be formed of a different material. Third component 72c may extend from the location of brazed joint 84b towards a fifth end 72g proximate second end 35 of fuel injector 30. Fifth end 72g may include mating features, for example, a third step feature 72h configured to mate with fuel injector 30.

Air assist shroud 74 may include a tubular structure, having a longitudinal cavity positioned radially inwards of gas pilot shroud 72. Pilot gas duct 64 may occupy the space between gas pilot shroud 72 and air assist shroud 74. Air assist shroud may also be made of any material, such as, for example stainless steel 316L, hastealloy, etc. In some embodiments, air assist shroud may be made of stainless steel 316L. Air assist shroud 74 may extend from a sixth end 74a proximate combustor 50 to a seventh end 74b proximate fifth end 72g of gas pilot shroud 72. Sixth end 74a and seventh end 74b of air assist shroud 74 may both include mating features, such as, for example, a fourth step feature 74c and a fifth step feature 74d, respectively. Fourth step feature 74c may mate with second step feature 72e at fourth end 72f of gas pilot shroud 72 to retain air assist shroud 74 within gas pilot shroud 72. A sealing member, such as, for example, a first c-seal 86a may be positioned between fourth step feature 74c and second step feature 72e. The sealing member may ensure a substantially fluid-tight seal between the sixth end 74a of air assist shroud 74 and fourth end 72f of gas pilot shroud 72. The concentrically positioned premix tube 46, gas pilot shroud 72, and air assist shroud 74 may collectively form pilot assembly 40. In general, the size of pilot assembly 40 and its components may depend upon the application.

Figure 5:
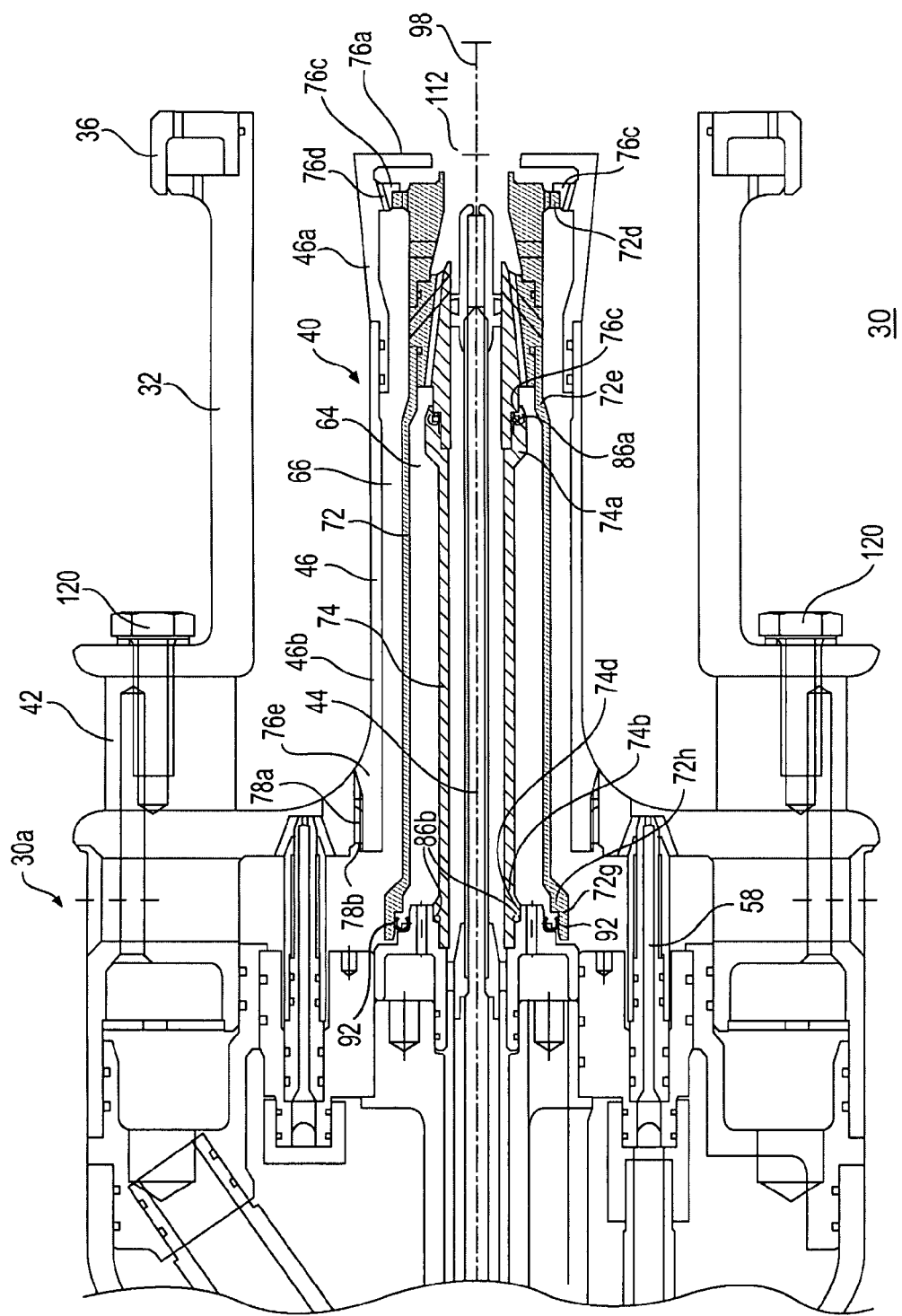
FIG. 5 is a cross-sectional illustration of the fuel injector of FIG. 2.

FIG. 5 shows a cross-section view of fuel injector 30 to illustrate coupling of pilot assembly 40 with fuel injector 30. Reference will be made to both FIG. 4 and FIG. 5 in the following discussion. Housing 30a of fuel injector 30 may include internal screw threads 78b configured to mate with external screw threads 78a on third end 76e of pilot tube 46b. To couple pilot assembly 40 to fuel injector 30, the pilot assembly 40 may be slid over pilot liquid tube 44, protruding from housing 30a, such that seventh end 74b of air assist shroud 74 and fifth end 72g of gas pilot shroud 72 abut corresponding features on housing 30a. In this configuration, external screw threads 78a on pilot assembly 40 may align with internal screw threads 78b on housing 30a. Sealing members may be included between the mating regions of seventh end 74b and housing 30a, and fifth end 72g and housing 30a. For instance, a second c-seal 86b may be included between fifth step feature 74d on seventh end 74b and a mating part of housing 30a, and a third c-seal 92 may be included between third step feature 72h on fifth end 72g and a mating part of housing 30a. Second c-seal 86b and third c-seal 92 may include annular compressible rings that may compress to form a tight seal between the mating components. The first, second and third c-seals 86a, 86b, and 92 may be made of any material, such as, for example, Inconel 718. In some embodiments, these c-seals may be made of multiple materials, such as, for example, a coating of silver or nickel on Inconel 718.

When pilot assembly 40 is rotated about longitudinal axis 98, external screw threads 78a on pilot assembly 40 may engage with mating internal screw threads 78b on housing 30a to couple pilot assembly 40 to housing 30a. As the screw threads engage, premix tube 46 may be drawn inwards towards second end 35 of fuel injector 30. This inwards movement of premix tube 46 may cause first step feature 76c of premix tube 46 to push second flange 72d of gas pilot shroud 72 also inwards. The inward movement of the gas pilot shroud 72 may, in turn, cause second step feature 72e of gas pilot shroud 72 to push air assist shroud 74 towards second end 35 of fuel injector 30. The pushing of these components towards second end 35 may compress first c-seal 86a, second c-seal 86b, and third c-seal 92 positioned at mating interfaces. The compressed c-seals may provide a tight seal between the mating interfaces substantially preventing fluid leak therethrough.

To disassemble pilot assembly 40, premix tube 46 may be rotated about longitudinal axis in a direction opposite to that used to couple pilot assembly 40 to housing 30a. External screw threads 78a may disengage from internal screw threads 78b on housing 30a to separate pilot assembly 40 from housing 30a. The pilot assembly 40 may then be slid over pilot liquid tube 44 to separate pilot assembly 40 from housing 30a. In some embodiments, premix barrel 32 of fuel injector 30 may be first removed to enable easy access to pilot assembly 40. Premix barrel 32 may be removed from fuel injector 30 by any means. In some embodiments, premix barrel 32 may be removably attached to fuel injector 30 by fasteners 120.

Figure 6A:
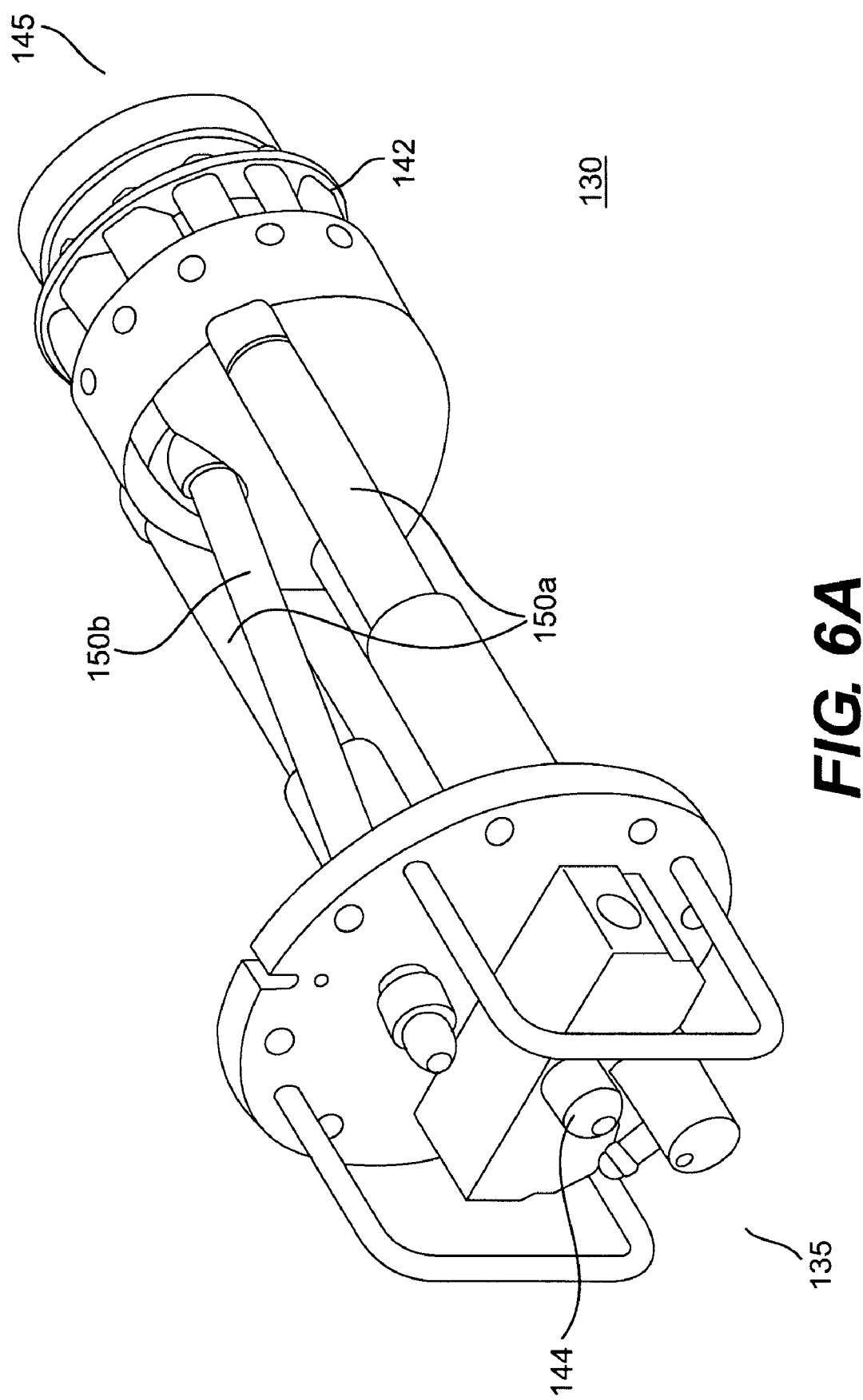
FIG. 6A is an illustration of another embodiment of a fuel injector attached to a combustor of the engine system of FIG. 1.
Figure 6B:
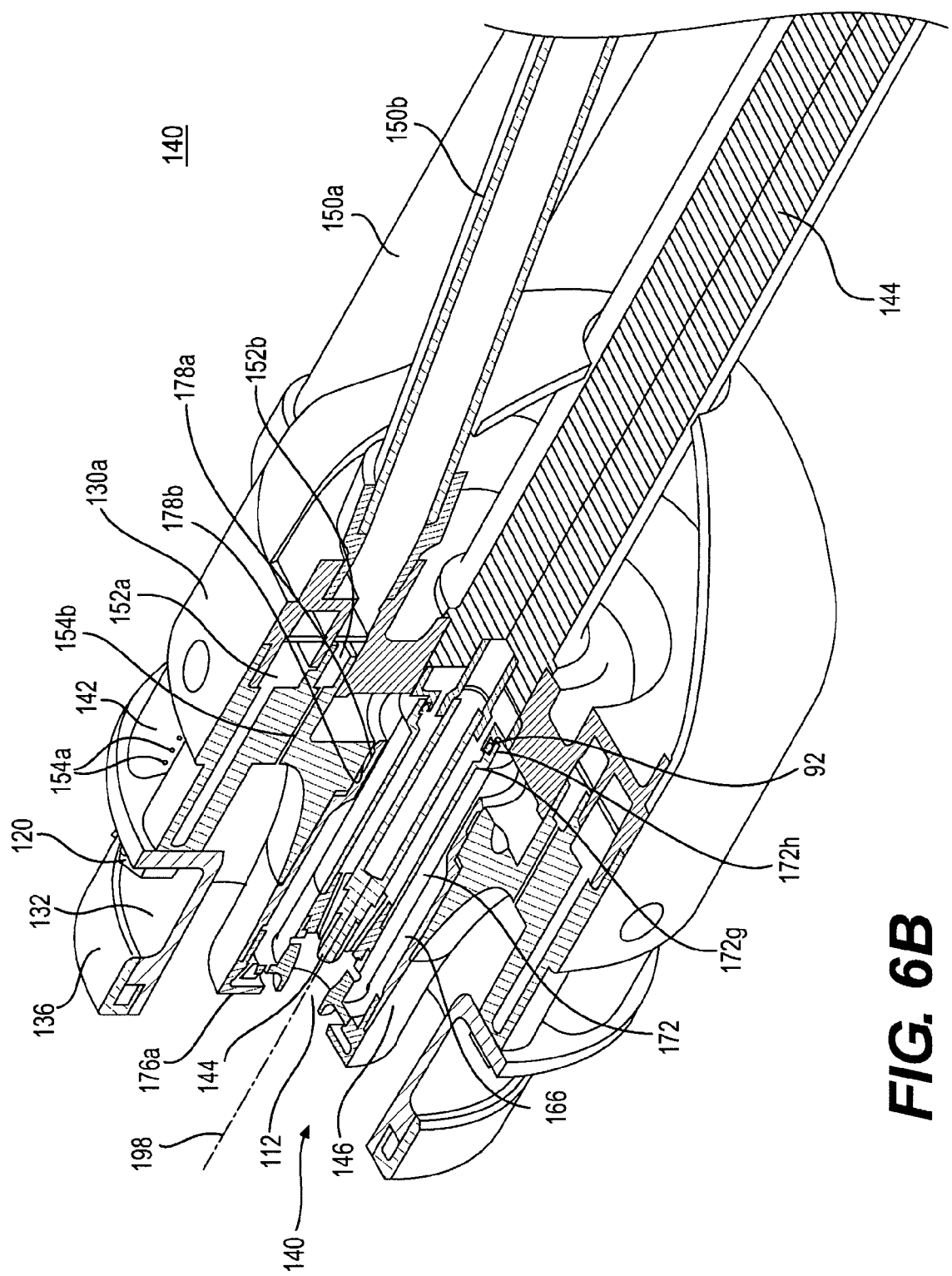
FIG. 6B is a cutaway illustration of the fuel injector of FIG. 6A.
Figure 6C:
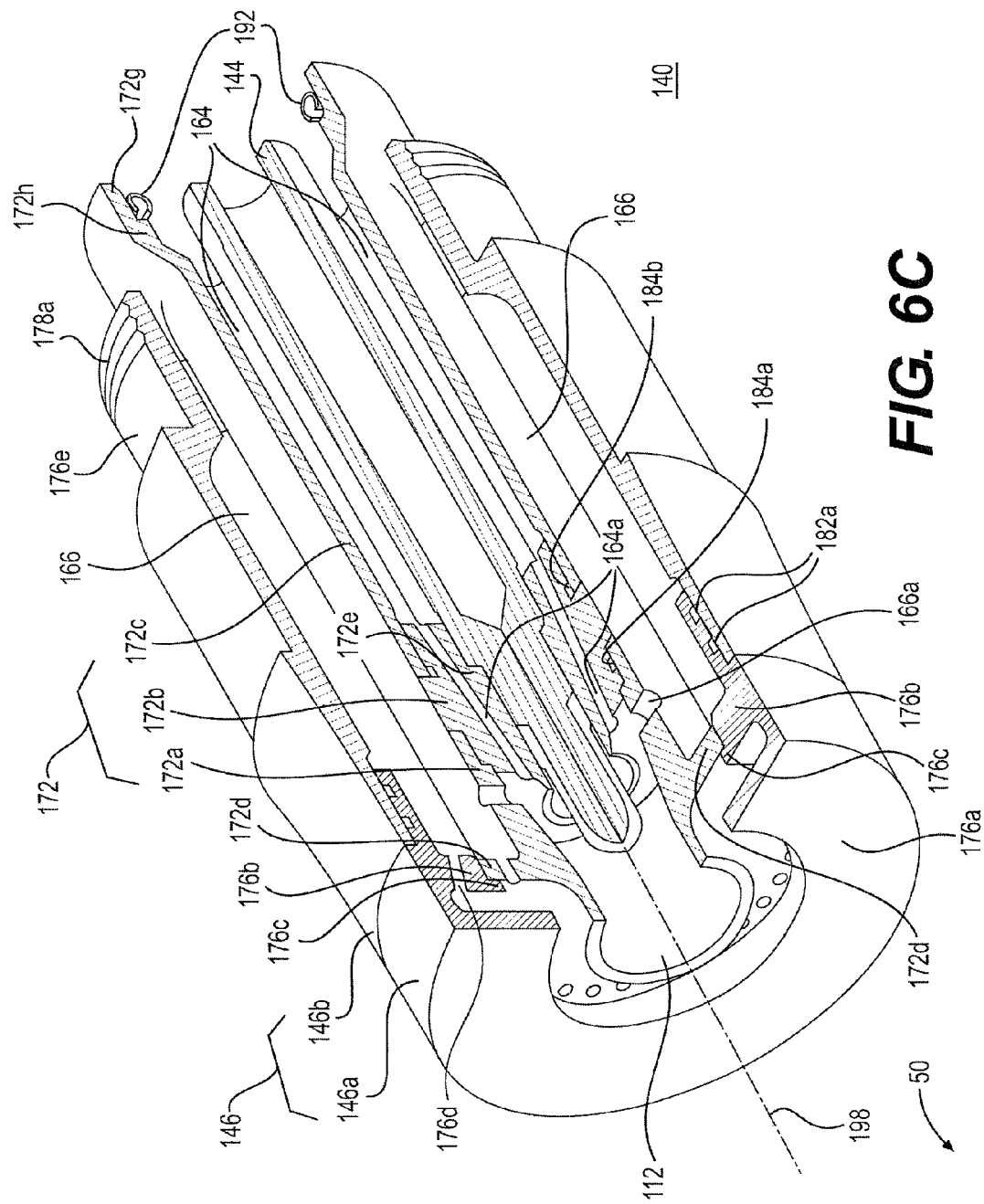
FIG. 6C is an illustration of a cutaway view of an exemplary pilot assembly of the fuel injector of FIG. 6A.

FIGS. 3A-5 illustrate embodiments of a fuel injector suited for some GTE applications. In general, the configuration of components of a fuel injector may depend upon the specific performance characteristics and design of GTE 100. For instance, in a GTE application using only gaseous fuel, liquid fuel lines and related components may be eliminated from the corresponding fuel injector 130. The components of such a fuel injector 130 may also be sized and configured to satisfy performance requirements of the GTE. FIGS. 6A-6C illustrate another embodiment of a fuel injector 130 configured to direct a pilot fuel stream and a premixed fuel stream to combustor 50.

FIG. 6A illustrates fuel injector 130 configured to provide fuel to combustor in a GTE application using only gaseous fuel. Gaseous fuel lines supply fuel from a second end 135 of fuel injector 130 to first end 145. First end 145 of fuel injector 130 may be coupled to a combustor 50 of a GTE 100. In the embodiment shown in FIG. 6A, primary fuel lines 150a and a secondary fuel line 150b supply fuel to fuel injector 130. Primary fuel lines 150a may comprise the main supply of fuel to fuel injector 130, while secondary fuel line 150b may provide supplemental fuel to fuel injector 130. The supplemental fuel may supply additional fuel to fuel injector 130, which may be needed for stable combustion. The supplemental fuel supplied through secondary fuel line 150b may temporarily enrich the fuel content of the fuel-air mixture delivered to combustor 50 by fuel injector 130. This enrichment of the fuel supply may increase flame temperature, thereby eliminating undesirable combustion induced effects, such as acoustic oscillations.

FIG. 6B illustrates a cutaway view of first end 145 of fuel injector 130. Primary fuel lines 150a may supply gaseous fuel to a main gas gallery 152a. Main gas gallery 152a may include an chamber annularly located about longitudinal axis 198, that delivers the fuel to gas ports 154a located on blades of air swirler 142. Secondary fuel line 150b may supply fuel to a secondary gas gallery 152b which may be annularly positioned about longitudinal axis 198. Secondary gas gallery 152b may deliver fuel to one or more secondary gas ports 154b annularly about longitudinal axis 198, and located upstream of air swirler 142.

Air swirler 142 may direct compressed air from compressor system 10 into fuel injector 130. The compressed air may mix with gaseous fuel injected through gas ports 154a and secondary gas ports 154b to form a premixed fuel-air mixture, that may be directed to combustor 50 through premix barrel 132. Premix barrel 132 may include an end cap 136 coupled thereto. End cap 136 may include an array of holes (not shown in FIG. 6B) arranged annularly around end cap 136. End cap 136 and the holes therein may serve the same function as holes on end cap 36 of fuel injector 30.

Fuel injector 130 may also include a pilot assembly 140 removably coupled thereto. Pilot assembly 140 may be positioned radially inwards of premix barrel 132 and may share a common longitudinal axis 198 with fuel injector 130. FIG. 6C illustrates pilot assembly 140 of fuel injector 130. In the discussion that follows, reference will be made to both FIGS. 6B and 6C. Pilot assembly 140 may include a pilot gas duct 164 and a pilot air duct 166 that may deliver gaseous fuel and compressed air, respectively, to pilot assembly. Pilot gas nozzle 164a may inject gaseous fuel from pilot gas duct 164 into combustor 50 through a central opening 112 of pilot assembly 140. Pilot air nozzle 166a may inject a stream of compressed air into combustor 50 along with fuel stream. Since the compressed air from pilot air nozzle 166a is injected proximate the fuel stream from pilot gas nozzle 164a, some mixing between the fuel and air may occur before they flow into combustor 50. This pilot stream of fuel and air may burn at the tip of pilot assembly 140.

Similar to pilot assembly 40 of FIG. 4, pilot assembly 140 may also include an inner premix tube 146 disposed about longitudinal axis 198, and a gas pilot shroud 172 located radially inwards of inner premix tube 146. Gas pilot shroud 172 may be positioned about a central rod 144 passing longitudinally through the center of fuel injector 130. Inner premix tube 146 and gas pilot shroud 172 may enclose pilot gas duct 164 and a pilot air duct 166 that may deliver fuel and air to pilot assembly 140. Inner premix tube 146 of fuel injector 130 may also include a pilot cap 146a brazed to a pilot tube 146b at braze joints 182a. Pilot cap 146a may also include an end face 176a, first flange 176b, first step 176c and cooling passages 176d on first flange 176b. End face 176a, first flange 176b, first step 176c, and cooling passages 176d may serve the same function in pilot assembly 40 as that in pilot assembly 140. External screw threads 178a may be formed on pilot tube 146b at a third end 176e opposite pilot cap 146a. These screw threads 178a may removably attach pilot assembly 140 to a housing 130a of fuel injector 130.

Similar to gas pilot shroud 72 of fuel injector 30 (FIG. 4), gas pilot shroud 172 of fuel injector 130 may also include a first component 172a, a second component 172b, and a third component 172c brazed together end-to-end to form a tubular structure. First component 172a may include a second flange 172d that may mate with first step feature 176c of pilot cap 146a. First component 172a may be brazed to second component 172b at brazed joint 184a, and second component 172b may be brazed to third component 172c at brazed joint 184b. Second component 172b may also include an annular region, projecting towards longitudinal axis 198, that includes one or more pilot gas nozzles 164a, and a second step feature 172e, that may be configured to mate with a corresponding feature on central rod 144. Third component 172c may extend from the location of brazed joint 184b towards a fifth end 172g. Fifth end 172g may include a third step feature 172h configured to mate with housing 130a. Since this embodiment of the fuel injector is not configured to deliver liquid fuel to combustor 50, pilot assembly 140 may exclude liquid fuel conduits. To configure pilot assembly 140 for a dual fuel operation (liquid and gaseous fuel), central rod 144 may be replaced with components similar to air assist shroud 74 and pilot liquid tube 44 of fuel injector 30 (FIG. 4).

Figure 6D:
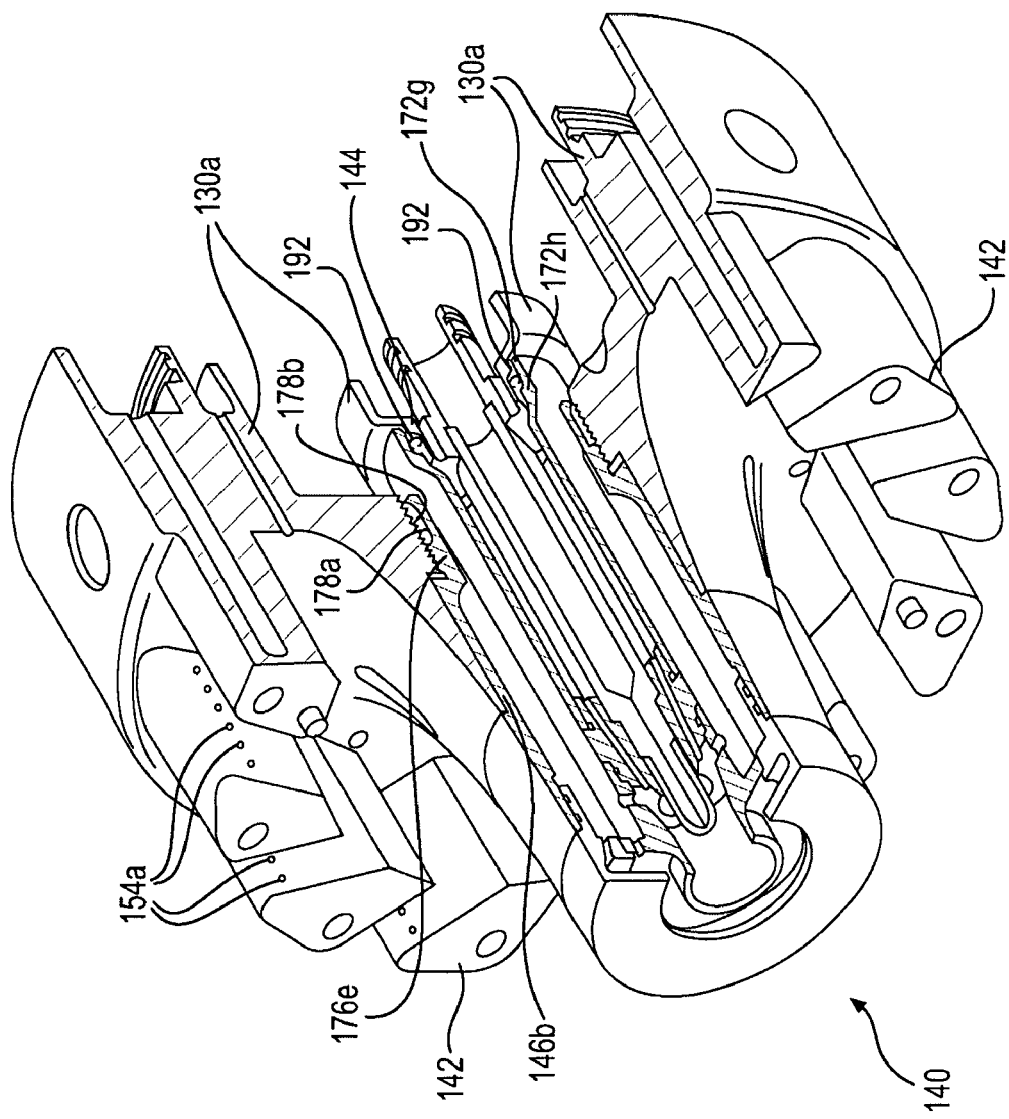
FIG. 6D is a cutaway illustration of the fuel injector of FIG. 6A coupled to a housing of the engine system of FIG. 1.

FIG. 6D illustrates a cutaway view of a section of fuel injector 130 showing the coupling of pilot assembly 140 to housing 130a. In FIG. 6D, only those portions of housing 130a required to describe the coupling of pilot assembly 140 to housing 130a is shown. Reference will be made to both FIGS. 6C and 6D in the following discussion. Housing 130a of fuel injector 130 may include internal screw threads 178b configured to mate with external screw threads 178a on third end 176e of pilot tube 146b. To couple pilot assembly 140 to fuel injector 130, pilot assembly 140 may be slid over central rod 144, protruding from housing 130a, such that third step feature 172h of gas pilot shroud 172 abuts corresponding features on housing 130a. In this configuration, external screw threads 178a on pilot assembly 140 may align with internal screw threads 178b on housing 130a. A sealing member, such as a third c-seal 192, may be located between third step feature 172h on fifth end 172g of gas pilot shroud 172 and a mating part of housing 130a.

To removably couple pilot assembly 140 to housing 130a, the screw threads of the pilot assembly and the housing (external screw threads 178a and internal screw threads 178b) may be aligned and the pilot assembly rotated about longitudinal axis 198 to engage the screw threads. As the screw threads engage, third c-seal 192 may compress and form a tight seal between the mating components substantially preventing leak of gaseous fuel and air from pilot gas duct 164 and pilot air duct 166. Pilot assembly 140 may be decoupled and separated from housing 130a by disengaging external screw threads 178a from internal screw threads 178b. The screw threads may be disengaged by rotating pilot assembly 140 about longitudinal axis 198 in a direction opposite to that used to couple pilot assembly 140 to housing 130a. As in fuel injector 30 of FIG. 5, in some embodiments, premix barrel 132 (FIG. 6B) of fuel injector 130 may be first removed by disengaging fasteners 120 before coupling or decoupling pilot assembly 140.

INDUSTRIAL APPLICABILITY

The disclosed gas turbine fuel injector with a removable pilot assembly may be applicable to any turbine engine where replacement of individual components of the injector may be desired. Although particularly relevant for gas turbine engines with annular combustors, the disclosed fuel injector may be applicable to any turbine engine regardless of the configuration of the combustor. The disclosed fuel injector may enable the replacement of defective components of the pilot assembly without replacing the entire fuel injector. The operation of a gas turbine engine with a fuel injector having a removable pilot assembly, and the method of replacing a defective component of the pilot assembly will now be described.

During operation of GTE 100, air may be drawn into GTE and compressed in compressor system 10 (See FIG. 1). This compressed air may then be directed into combustor system 20 through fuel injectors 30. As the compressed air flows into the injectors through air swirler 42 (FIG. 2), fuel may be injected into the swirled air stream to mix with the compressed air and form a premixed fuel-air mixture. This premixed fuel-air mixture may then proceed through premix barrel 32 to create a flame in combustor 50. For reduced $NO_x$ emissions, the amount of fuel injected into the swirled air stream may be controlled to create a lean premixed fuel-air mixture. This lean premixed fuel-air mixture may create a low temperature flame that may produce reduced $NO_x$ emissions. To prevent unstable combustion and flame extinguishment, a pressurized stream of fuel and compressed air may be injected into combustor 50 through pilot assembly 40. This pressurized stream of fuel and air may burn in combustor 50 at the tip of pilot assembly 40 to form a higher temperature diffusion flame. Although, this higher temperature flame may increase $NO_x$ emission of GTE 100, this flame may allow for stable combustion in combustor 50.

Prolonged exposure to the diffusion flame burning at the tip of pilot assembly 40 may deteriorate the components of the pilot assembly. In some embodiments, end face 76a of premix tube 46 may experience damage due to repeated exposure to the high temperature diffusion flame. During a routine maintenance event, it may be desirable to replace the damaged end face 76a of fuel injector 30. To replace end face 76a, premix tube 46 may be replaced. To replace premix tube 46, pilot assembly 40 may be detached from fuel injector 30.

To detach pilot assembly 40, premix barrel 32 may be removed from fuel injector 30 by removing fasteners 120 attaching premix barrel 32 to fuel injector 30 (FIG. 5). External screw threads 78a of pilot assembly 40 may be disengaged from inner screw threads 78b of housing 30a, to uncouple pilot assembly 40 from housing 30a. Pilot assembly 40 may be slid over pilot liquid tube 44 to separate the pilot assembly 40 from fuel injector 30. Premix tube 46, gas pilot shroud 72, and air assist shroud 74 of pilot assembly 40 may be uncoupled to separate these components.

The premix tube 46 with the damaged end face 76a may be replaced with a premix tube 46 with an undamaged end face 76a and the components coupled together to form pilot assembly 40. The pilot assembly with the replaced premix tube 46 may then be slid over the pilot liquid tube 44 and attached to fuel injector 30. The pilot assembly 40 may be attached to the fuel injector by engaging external screw threads 78a of pilot assembly 40 with inner screw threads 78b of housing 30a.

The ability to remove pilot assembly 40 from fuel injector 30, and to separate the components of pilot assembly 40 may allow individual defective components of pilot assembly 40 to be replaced in the field, without having to replace the entire fuel injector. The ability to decouple pilot assembly 40 from fuel injector 30 may also allow a fuel injector to be refitted with a later developed pilot assembly, thereby allowing for upgrading of fuel injector 30.

It will be apparent to those skilled in the art that various modifications and variations can be made to the disclosed fuel injector with a removable pilot assembly. Other embodiments will be apparent to those skilled in the art from consideration of the specification and practice of the disclosed fuel injector with a removable pilot assembly. It is intended that the specification and examples be considered as exemplary only, with a true scope being indicated by the following claims and their equivalents.

What is claimed is:

1. A fuel injector for a gas turbine engine comprising:
    an injector housing having a longitudinal axis, the injector housing including one or more fuel inlets, one or more fuel galleries annularly disposed about the longitudinal axis, and an air inlet;
    a premix barrel having a proximal end and a distal end circumferentially disposed about the longitudinal axis, the premix barrel being fluidly coupled to the fuel galleries and the air inlet at the proximal end and being configured to mechanically couple to a combustor of the gas turbine engine at the distal end, the premix barrel being configured to direct a first fuel stream to the combustor, the first fuel stream being a premixed air-fuel mixture; and
    a pilot assembly disposed radially inwards of the premix barrel and configured to direct a second fuel stream to the combustor unmixed with the first fuel stream, the pilot assembly having a first end and a second end, the second end being removably coupled to the injector housing and the first end being proximate the distal end of the premix barrel, the pilot assembly being fluidly coupled to the fuel galleries, the air inlet, and the combustor, wherein the pilot assembly further includes first screw threads on an external surface and the injector housing includes mating second screw threads on an internal surface, and the pilot assembly is removably coupled to the injector housing by engaging the first screw threads with the second screw threads.

2. The fuel injector of claim 1, wherein the pilot assembly includes,
    two or more tubular components disposed annularly about the longitudinal axis, and
    an air duct and a fuel duct annularly disposed about the longitudinal axis, the air duct being fluidly coupled to the air inlet and the fuel duct being fluidly coupled to at least one of the fuel galleries.

3. The fuel injector of claim 2, wherein the two or more tubular components include a tubular first component a tubular second component and a tubular third component, the second component being disposed radially inwards of the first component and the third component being disposed radially inwards of the second component.

4. The fuel injector of claim 3, wherein the air duct and the fuel duct are each formed in an annular space between the first component the second component and the third component.

5. The fuel injector of claim 3, wherein a plurality of air holes fluidly couple the air duct to the combustor and a plurality of fuel nozzles fluidly couple the fuel duct to the combustor, the air holes and the fuel nozzles being each annularly arranged about the longitudinal axis.

6. The fuel injector of claim 5, wherein a number of air holes and a number of fuel nozzles are the same and each air hole is positioned proximate a fuel nozzle.

7. The fuel injector of claim 5, wherein the plurality of air holes and the plurality of fuel nozzles are located on the second component.

8. The fuel injector of claim 3, wherein the first component includes a first flange proximate the first end of the pilot assembly and the second component includes a second flange proximate the first end and a third step feature proximate the second end of the pilot assembly, the first flange mating with the second flange and the third step feature mating with a fourth step feature of the injector housing when the pilot assembly is coupled to the injector housing.

9. The fuel injector of claim 8, wherein the second component includes a second step feature positioned between the second flange and the third step feature and the third component includes a fourth step feature proximate the first end and a fifth step feature proximate the second end, the second step feature mating with the fourth step feature and the fifth step feature mating with an eighth step feature of the injector housing when the pilot assembly is coupled to the injector housing.

10. The fuel injector of claim 9, wherein the first flange, the second flange, the third step feature, the second step feature, the fourth step feature, and the fifth step feature are each annularly disposed about the longitudinal axis.

11. The fuel injector of claim 10, further including,
a first sealing member between the third step feature and the fourth step feature,
a second sealing member between the second step feature and the fourth step feature, and
a third sealing member between the fifth step feature and the eighth step feature.

12. A gas turbine engine:
a central shaft having a first longitudinal axis;
a compressor coupled to the central shaft;
a combustor fluidly coupled to the compressor and annularly disposed around the first longitudinal axis; and
a plurality of fuel injectors each having a second longitudinal axis and coupled to the combustor, each fuel injector of the plurality being annularly arranged about the first longitudinal axis and including;
a housing including one or more fuel conduits and an air inlet;
a substantially cylindrical premix barrel disposed circumferentially around the second longitudinal axis, the premix barrel being coupled to the housing at one end and the combustor at an opposite end, the premix barrel being configured to direct a first fuel stream to the combustor, the first fuel stream being a premixed air-fuel mixture; and
a pilot assembly disposed radially inwards of the premix barrel and configured to direct a second fuel stream to the combustor unmixed with the first fuel stream, the pilot assembly being concentrically aligned with the second longitudinal axis and removably coupled to the housing, wherein the pilot assembly includes first screw threads on a curved external surface and the housing includes mating second screw threads on an internal surface and the pilot assembly is removably coupled to the housing by engaging the first screw threads with the second screw threads, the pilot assembly including,
two or more concentric tubular components disposed about the second longitudinal axis, and
a fuel duct and an air duct each formed in an annular space between the two or more tubular components, the fuel duct fluidly communicating the fuel conduits to the combustor and the air duct fluidly communicating the air inlet to the combustor.

13. The gas turbine engine of claim 12, wherein the two or more tubular components include a first tubular component a second tubular component and a third tubular component, the second component being disposed radially inwards of the first component and the third component being disposed radially inwards of the second component, the air duct being formed between the first component and the second component and the fuel duct being formed between the second component and the third component.

14. A pilot assembly for a gas turbine fuel injector:
an outer tube having a first end and a second end disposed about a longitudinal axis, the outer tube including;
screw threads on an external surface proximate the second end, the screw threads being configured to mate with internal screw threads in a housing of the fuel injector to removably couple the pilot assembly with the fuel injector;
an end surface extending radially inwards from the first end;
an annular first flange extending radially inwards from a location proximate the first end, the first flange including a plurality of cooling passages annularly arranged about the longitudinal axis;
a middle tube having a third end and a fourth end, the middle tube being disposed about the longitudinal axis and being located radially inwards of the outer tube, the middle tube including;
a plurality of holes extending from an external surface to an internal surface of the middle tube proximate the third end annularly arranged about the longitudinal axis
an annular second flange extending radially outwards from the external surface proximate the third end, the second flange abutting the first flange of the outer tube;
an annular projection extending radially inwards; and
an inner tube having a fifth end and a sixth end disposed about the longitudinal axis and located radially inwards of the middle tube, the fifth end abutting the annular projection of the middle tube.

15. The pilot assembly of claim 14, wherein the first end of the outer tube is proximate the third end of the middle tube and the second end of the outer tube is proximate the fourth end of the middle tube and the sixth end of the inner tube.

16. The pilot assembly of claim 15, further including,
an air duct formed in an annular space between the outer tube and the middle tube, the plurality of holes fluidly communicating the air duct to a region within the middle tube; and
a gas duet formed in an annular space between the middle tube and the inner tube.

17. The pilot assembly of claim 16, wherein the middle tube includes a first component, a second component, and a third component attached end to end to form a substantially tubular structure, the first component including the second flange and the second component including the annular projection.

18. The pilot assembly of claim 17, wherein the second component further includes a plurality of gas nozzles arranged annularly around the longitudinal axis, the gas nozzles fluidly communicating the gas duct to the region within the middle tube.

* * * * *